United States Patent [19]

Anthony et al.

[11] 4,167,410
[45] Sep. 11, 1979

[54] ALLOY FOR USE IN BRAZED ASSEMBLIES

[75] Inventors: William H. Anthony, Manchester, Mo.; James M. Popplewell, Guilford; Andrew J. Brock, Cheshire, both of Conn.

[73] Assignee: Swiss Aluminium Ltd., Chippis, Switzerland

[21] Appl. No.: 881,071

[22] Filed: Feb. 24, 1978

Related U.S. Application Data

[63] Continuation-in-part of Ser. No. 773,959, Mar. 3, 1977, Pat. No. 4,093,782.

[51] Int. Cl.² .............................................. C22C 21/00
[52] U.S. Cl. ......................................... 75/138; 75/148
[58] Field of Search ..................... 75/138, 148; 148/32

[56] References Cited

U.S. PATENT DOCUMENTS 1,830,142  11/1931  Taylor et al. ........................... 75/138
3,878,871  4/1975  Anthony et al. ........................ 75/148

Primary Examiner—R. Dean
Attorney, Agent, or Firm—Bachman and LaPointe

[57] ABSTRACT

An improved corrosion resistant aluminum alloy for use in the manufacture of brazed assemblies having improved sag resistant properties is disclosed. The alloy consists essentially of an aluminum base alloy containing from 0.05 to 0.4% chromium, from 0.02 to 0.9% manganese, up to 0.2% iron, up to 0.1% silicon and the balance essentially aluminum.

5 Claims, 12 Drawing Figures

SAG RESISTANCE OF ALLOYS Z (3003), Y AND X DURING EXPOSURE TO SIMULATED VACUUM BRAZING CYCLE FOR 8 MINUTES AT 1100° F

TIME AT 1115°F. IN MINUTES

ZERO    15    30    60    300

SAG RESISTANCE OF ALLOYS Z (3003), Y AND X DURING EXPOSURE TO SIMULATED VACUUM BRAZING CYCLE FOR 8 MINUTES AT 1100° F 4,167,410

ALLOY FOR USE IN BRAZED ASSEMBLIES

CROSS REFERENCE TO RELATED APPLICATION

The present application is a Continuation-In-Part of co-pending application Ser. No. 773,959, filed Mar. 3, 1977, now U.S. Pat. No. 4,093,782.

BACKGROUND OF THE INVENTION

Brazed aluminum equipment is subject to the severe problem of intergranular corrosion in corrosive environments on both clad and unclad surfaces. The corrosive environments which can cause this problem include water containing dissolved chloride, bicarbonate or sulfate ions, especially if the pH of the water has a relatively low value. Such waters may condense as films on the fins of heat exchanger equipment used for automotive or aircraft air conditioners, automotive radiators, gas liquefaction equipment or the like.

Intergranular corrosion has also been encountered in other applications, as on brazed headers inside automotive radiators and heat exchangers generally. In such cases, the coolant is usually corrosive. For example, if automotive antifreeze solutions are used, poor maintenance can often result in the solution becoming corrosive for a variety of reasons. Chief among these reasons are that the antifreeze may have been allowed to remain in the radiator for a number of years without replacement while replenishing the level with mixtures of fresh antifreeze solution with hard natural water. These practices would deplete the corrosion inhibitors and reserve alkalinity components, permitting the coolant pH to drop and allowing heavy metal ions to accumulate from reaction of the acids with copper alloy and cast iron surfaces in the coolant system.

U.S. Pat. Nos. 3,898,053 and 3,853,547 describe certain aluminum-silicon brazing compositions for joining aluminum alloy components; however, these compositions do not solve the problem of intergranular corrosion described hereinabove.

The problem of intergranular corrosion may occur whether flux brazing or vacuum brazing techniques are employed. There is evidence in the case of flux brazed aluminum Alloy 3003 (an aluminum base alloy containing from 0.05 to 0.20% copper, from 1 to 1.5% manganese, up to 0.6% silicon and up to 0.7% iron) clad with aluminum Alloy 4343 (an aluminum base alloy containing from 6.8 to 8.2% silicon, up to 0.8% iron, up to 0.25% copper, up to 0.1% manganese, up to 0.2% zinc and the balance essentially aluminum) that the silicon rich eutectic formed when the Alloy 4343 brazing alloy is brazed can migrate into the grain boundaries of the Alloy 3003 component and can cause increased susceptibility to intergranular corrosion. A similar silicon rich eutectic migration into the parent metal can occur in the case of vacuum brazed assemblies made from aluminum Alloy 3003 clad with the silicon rich aluminum vacuum brazing Alloy MD 150 (an aluminum base alloy containing about 9.5% silicon, 1.5% magnesium, up to 0.3% iron, up to 0.05% copper, up to 0.07% manganese, up to 0.01% titanium and the balance essentially aluminum) or aluminum vacuum brazing Alloy MD 177. The MD 177 alloy has substantially the same composition as MD 150 containing in addition from 0.08 to 0.1% added bismuth. In both MD 150 and MD 177 the magnesium addition is used to getter traces of oxygen in the vacuum brazing furnaces.

Flux brazed assemblies made from No. 12 brazing sheet (aluminum Alloy 3003 clad on both sides with aluminum Alloy 4343) and monolithic aluminum Alloy 3003 components are sensitized to corrosion by prolonged holding at elevated temperatures below the brazing temperature. This practice is used to assure that the final relatively short time on both clad and unclad surfaces brazing step will liquify the brazing alloy everywhere in very large assemblies. The effect of this holding time, which may be up to 5 hours at 1000° F. for large gas liquefaction heat exchangers, is to coarsen cathodic iron rich second phase particles in the metal. This causes increased susceptibility to both intergranular corrosion and pitting corrosion on both clad and unclad surfaces.

In addition to the poor corrosion resistant properties of typical alloys, such as 3003 used in the manufacture of brazed assemblies, it has been found that the sag resistant properties of those typical alloys leave much to be desired. Good sag resistant properties are most important in providing good dimensional stability in large brazed assemblies such as gas separation units. Therefore, it would be highly desirable to produce an alloy for use in the manufacture of brazed assemblies which exhibit improved and superior sag resistant properties as compared to those alloys previously known.

Accordingly, it is the principal object of the present invention to provide an improved aluminum alloy for use in the manufacture of brazed assemblies which is characterized by substantial resistance to intergranular corrosion.

It is still a further object of the present invention to provide an improved aluminum alloy for use in the manufacture of brazed assemblies which is characterized by having substantial resistance to pitting corrosion.

It is still a further object of the present invention to provide an improved corrosion resistant aluminum alloy which is characterized by substantial resistance to sag.

Further objects and advantages will appear hereinbelow.

SUMMARY OF THE INVENTION

In accordance with the present invention it has now been found that the foregoing objects and advantages may be readily obtained. The aluminum alloy of the present invention is characterized by improved intergranular corrosion, pitting corrosion and sag resistant properties. The alloy of the present invention is an aluminum base alloy consisting essentially of from 0.05 to 0.4% chromium, from 0.2 to 0.9% manganese, up to 0.2% iron, up to 0.1% silicon and the balance essentially aluminum.

The present invention resides in an improved aluminum alloy for use in the manufacture of brazed assemblies. It is a particular and surprising feature of the present invention that the aluminum alloy of the present invention is characterized by greatly improved resistance to intergranular and pitting corrosion while obtaining superior sag resistant properties.

BRIEF DESCRIPTION OF THE DRAWINGS

The present invention will be more readily understood from a consideration of the following illustrative drawings in which.

DETAILED DESCRIPTION OF PREFERRED EMBODIMENTS

Figure 1A:
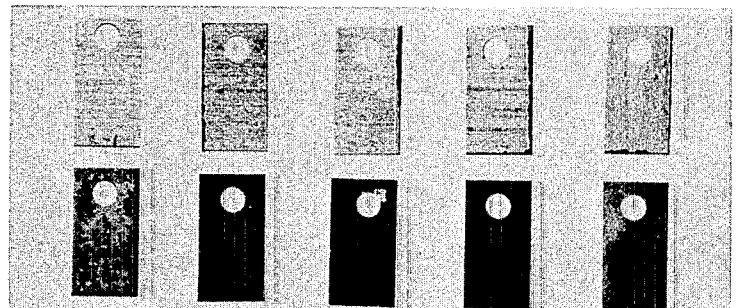
FIGS. 1A, 1B and 1C are photographs of clad and unclad sides of samples following exposure to a corrosive environment.

As described hereinabove, the alloy of the present invention is characterized by improved resistance to intergranular corrosion and pitting corrosion while exhibiting superior sag resistant properties as compared to alloys heretofore used in the manufacture of brazed assemblies. It is a finding of the present invention that the susceptibility of brazed assemblies to intergranular corrosion due to silicon migration and coarsening of iron containing second phase particles may be drastically reduced by using a parent alloy containing significantly restricted concentrations of both iron and silicon to which specific amounts of manganese and chromium have been added as purposeful additions.

The effect of restricting the iron and silicon concentrations is to reduce the size and population density of second phase particles rich in iron which are most frequently alpha phase particles containing iron, silicon and manganese. Restricting the silicon concentration of the aluminum alloy of the present invention when it is used as the core alloy in a brazed composite allows the alloy to be a good solvent for the silicon rich eutectic which tends to migrate into the core from the cladding brazing alloy. The effect of this is to drastically reduce the depth to which such migration may occur into the parent metal and thereby greatly reduce intergranular corrosion. Restricting the iron concentration of the alloy of the present invention while adding purposeful additions of manganese and chromium prevents the formation of the highly cathodic $FeAl_3$ phase. This is true regardless of whether the alloy is used as the core of the composite or where the monolithic alloy is used in the manufacture of brazed assemblies. The effect of this restriction of iron and purposeful additions of manganese and chromium is to reduce the concentration of those highly cathodic phases which result in severe intergranular and pitting corrosion.

In accordance with the present invention, the aluminum alloy contains from about 0.05 to 0.4% chromium and preferably from 0.15 to 0.30% chromium. The manganese content is from 0.2 to 0.9% and preferably from 0.3 to 0.6%. The iron content is up to 0.2%, preferably up to 0.1% and optimally from 0.02 to 0.08%. The silicon content is up to 0.1% and preferably from 0.02 to 0.08%.

The aluminum alloy of the present invention may be used either clad or unclad in the manufacture of brazed aluminum assemblies. Any silicon containing aluminum brazing alloy may be employed as the cladding material wherein the silicon content ranges from 4 to 14%, such as, for example, the MD 150 and MD 177 alloys and also aluminum Alloy 4045 (an aluminum base alloy containing from 9 to 11% silicon).

The deliberate manganese addition in the core alloy as well as the restrictive concentration of iron performs a beneficial role by preventing formation of the highly cathodic $FeAl_3$ phase which is present in commercial manganese free aluminum alloys. Concentrations of manganese beyond the desired range such as manganese concentrations of 1% or more which are present in commercial Alloy 3003 cause excessive precipitation of $MnAl_6$ particles. These particles have an electrode potential almost the same as an aluminum matrix in a substantially iron free system. However, in commercial purity aluminum base alloy matrices, there is sufficient iron present to cause the $MnAl_6$ particles to dissolve enough iron to become cathodic to the matrix aluminum and cause localized corrosion. The chromium addition in the alloy of the present invention shifts the electrode potential of the metal in the noble direction. This, in a corrosive media, is enough to make the alloy of the present invention more noble than any cladding alloy used therewith in a composite and thereby prevent anodic dissolution of the parent metal by a galvanic couple. A second and perhaps more important role of the chromium is to act as a corrosion inhibitor at sites of localized corrosion, such as pits, grain boundaries or crevices which may occur on the unclad or monolithic alloy. Where such corrosion occurs, the corrosion product contains soluble chromate ions which may migrate to the anodic sites where they act as anodic type corrosion inhibitors.

In addition to the above, the alloy of the present invention exhibits superior sag resistant properties to those alloys previously used in brazed assemblies or brazing composites such as aluminum Alloy 3003. This superior property can be attributable to the larger grains which are obtained in the alloy of the present invention because of the restrictive additions of iron, manganese, silicon and chromium. The larger grain size results in less grain boundary area in which slippage can occur thus resulting in sag. Thus, the alloy of the present invention is particularly suited for use in the manufacturing of large brazed assemblies where dimensional integrity is of the essence.

The alloy of the present invention is particularly useful in the manufacture of brazed equipment by mass production methods involving either flux or vacuum brazing. The alloy of the present invention has particular value for equipment which is expected to encounter corrosive conditions which could cause intergranular corrosion of the alloy. Vacuum brazed aluminum heater cores have been found to have severe intergranular corrosion problems when made using conventional brazing sheets with Alloy 3003 as the parent metal. These heater cores are used, for example, to provide warm air to warm the passenger compartment of passenger cars by abstracting excess heat from the automotive engine coolant. The intergranular corrosion results from contact between the corrosive aqueous engine coolant and the internal surfaces of the plate channels. When the alloy of the present invention is used as the core material in a brazing composite, it significantly reduces the intergranular corrosion which occurs in this type of application. Other automotive applications exist for which a composite made with the alloy of the present invention is quite suitable, including automotive radiators and oil coolers in the engine systems and also evaporators and condensers in automotive air conditioning systems. The alloy of the present invention is particularly suited to be used as a monolithic sheet in an assembly with the brazing alloy in the form of another sheet or foil associated therewith. The alloy of the present invention is particularly suited for the use in the manufacture of brazed assemblies, particularly large brazed assemblies, where good dimensional stability is critical.

The present invention will be more readily understandable from a consideration of the following illustrative examples.

EXAMPLE I

Two core ingots were cast having the composition set forth below, with Alloy A representing the material of the present invention and Alloy B being a comparative alloy.

| Alloy A | | Alloy B | |
|---|---|---|---|
| Silicon | - 0.04% | Chromium | - 0.15% |
| Chromium | - 0.3% | Iron | - 0.04% |
| Manganese | - 0.4% | Silicon | - 0.04% |
| Iron | - 0.035% | Aluminum | - Balance |
| Titanium | - 0.01% | | |
| Aluminum | - Balance | | |

Direct chill castings of ingots of Alloys A and B were homogenized at 1125° F. for 8 hours using a maximum heat up rate from 600° F. of 50° F. per hour. The ingots were cooled from 1125° F. to 600° F. at 25° F. per hour and air cooled to room temperature. The core materials of Alloys A and B were scalped to 1.5" thickness and were brushed on one side.

EXAMPLE II

Durville ingots were cast to the compositions shown in Table I below.

TABLE I

| | | Percentage of Element | | | | | | |
|---|---|---|---|---|---|---|---|---|
| Alloy Type | Alloy | Si | Fe | Cu | Mn | Ti | Mg | Bi |
| 4343 | C | 7.5 | .35 | .05 | — | .01 | — | — |
| MD 150 | D | 9.7 | .3 | .05 | .07 | .01 | 1.5 | — |
| MD 177 | E | 9.7 | .3 | .05 | .07 | .01 | 1.5 | .1 |

The foregoing Alloys C, D and E represent silicon rich cladding alloys. The Durville ingots of Alloys C, D and E were scalped to 1.5" thickness. They were reheated to 800° F. for 1 hour and hot rolled to 0.15" gage. The hot rolling scale was removed by caustic etching and rinsing.

EXAMPLE III

Brazing sheets of Alloy C clad on Alloy A and Alloy C clad on Alloy B were fabricated. In addition, for comparative purposes a brazing sheet of Alloy 4343 (Alloy C) clad on Alloy 3003 was prepared. All brazing sheets were one side clad only. The brazing sheets were fabricated by welding the appropriate brazing alloy to the wire brushed side of the parent alloy and hot rolling the sandwich. An 800° F. entry temperature was used. One side was left unwelded to permit air to be expelled from the mating surface. Hot rolling was continued until the sandwiches were 0.15" thick. They were then cold rolled to 0.030" and annealed by heating to 660° F. at a rate of 25° F. per hour from 300° F., held at 660° F. for 2 hours, cooled to 400° F. at 25° F. per hour, and air cooled from 400° F. to room temperature.

EXAMPLE IV

The brazing sheets were subjected to a simulated flux brazing cycle such as might be applied to a bulky assembly. The simulated flux brazing cycle included stacking 4"×4" sheets in a tray and placing the tray in a muffle furnace. A thermocouple was present in a dummy load in the furnace in order to determine metal temperature. Samples were heated to 1000° F. and held at this temperature for 5 hours to simulate the preheat step. They were then heated to 1115° F. for periods of 15 minutes, 30 minutes, 60 minutes and 300 minutes with some samples unheated. The samples were then cut to 1"×½" specimens and a hole was punched near one of the ½" edges to permit them to be supported on a nylon threaded rod support. All of the specimens were immersed for 140 hours at 40° F. in a solution having composition set forth in Table II below.

TABLE II

| 0.1 | Molar | NaCl |
|---|---|---|
| 0.01 | Molar | NaNO$_3$ |
| 2.0 | cc glacial acetic acid | |
| 4.0 | cc 30% H$_2$O$_2$ | |
| | all in 1 liter of distilled water | |

Figure 1B:
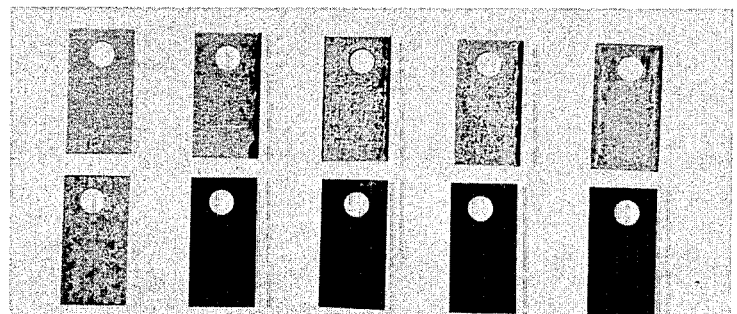
Figure 1C:
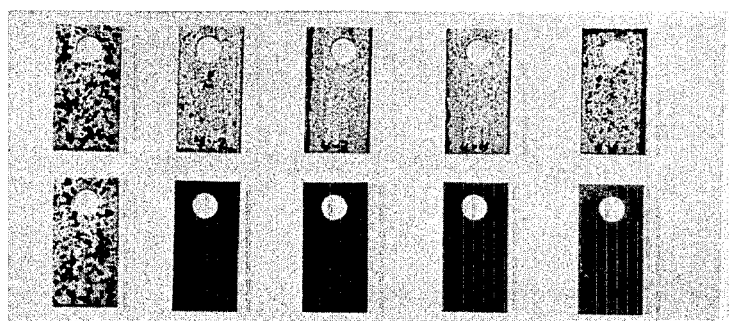

The foregoing solution was designed to simulate the particularly corrosive service to which air liquidation heat exchangers are exposed. The photographs of FIG. 1 show the appearance of the clad and unclad sides of the samples following this exposure. FIG. 1A represents Alloy C clad on Alloy A. FIG. 1B represents Alloy C clad on Alloy B. FIG. 1C represents Alloy C clad on Alloy 3003 corresponding to No. 11 brazing sheet. It is apparent that the Alloy C clad on Alloy A sample of the present invention is completely free of visual evidence of corrosion on both its clad and unclad surfaces. The Alloy C on Alloy B comparative material exhibits some pits on the unclad side, but no attack on the clad side. These pits were found to have the depths set forth in Table III below depending upon the time at 1115° F.

TABLE III

| Pitting into the unclad side of the C on B brazing sheet | |
|---|---|
| Time at 1115° F. in minutes | Average pit depth in mils |
| 0 | 0 |
| 15 | 7.0 |
| 30 | 8.6 |
| 60 | 7.5 |
| 300 | 12.2 |

The No. 11 brazing sheet (FIG. 1C) is severely affected by the exposure on the unclad side where the brazing time is either zero or 300 minutes and is moderately affected for the 15, 30 and 60 minute brazing times. The form of attack was blister formation. Examination of the clad side of the No. 11 brazing sheet (FIG. 1C) shows severe attack only in the case of the sample which had not been subjected to simulated brazing at 1115° F. Thus, it can be seen that the alloy of the present invention whether clad or unclad exhibits no corrosive attack on either the clad or the unclad side. In contrast, a severe pitting attack occurred on unclad aluminum Alloy 3003.

EXAMPLE V

Figure 2A:
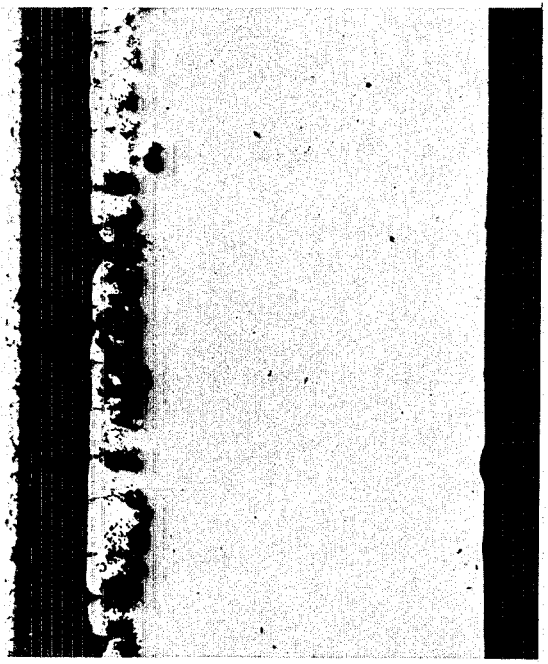
FIGS. 2A, 2B, 2C and 2D are photomicrographs at a magnification of 200X showing cross sections through composites after exposure to a corrosive environment.
Figure 2B:
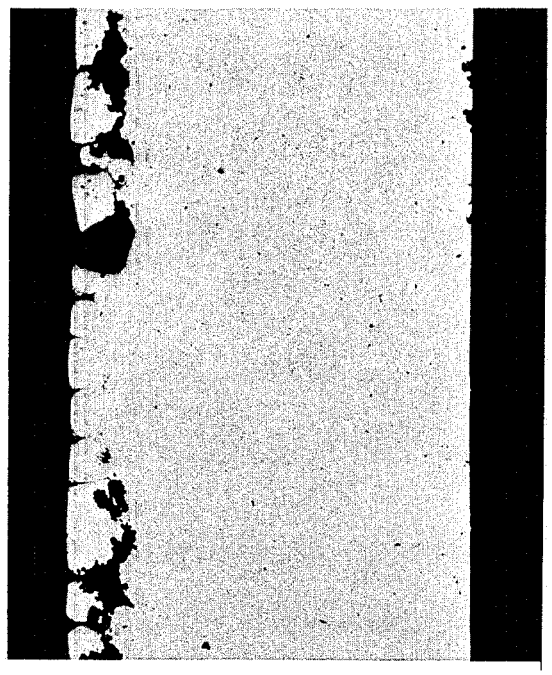
Figure 2C:
Figure 2D:
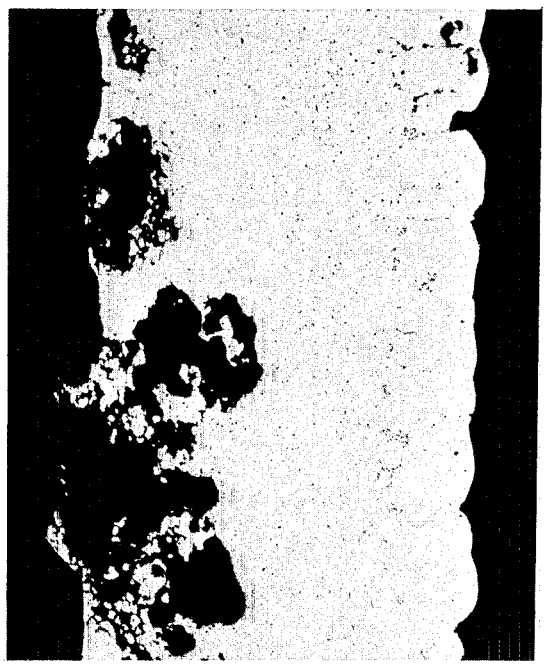

FIGS. 2A, 2B, 2C and 2D represent photomicrographs of cross sections through specimens of Alloy C clad on Alloy A and No. 11 brazing sheet following exposure for 140 hours to the corrosive solution of Table II at 25° F. and 40° F. The photomicrographs are at a magnification of 200X. FIG. 2A represents Alloy C clad on Alloy A following exposure at 25° F., FIG. 2B represents Alloy C clad on Alloy A following exposure at 40° F., FIG. 2C represents No. 11 brazing sheet following exposure at 25° F. and FIG. 2D represents No. 11 brazing sheet following exposure at 40° F. The results shown in FIG. 2 indicate that over a range of flux brazing conditions the Alloy C clad on Alloy A brazing sheet of the present invention was much more resistant to intergranular corrosion on the clad and unclad surfaces than the No. 11 brazing sheet. The results in FIG. 1 show severe pitting on the core element on the comparative Alloy C clad on Alloy B brazing sheet. The Alloy A element of the Alloy C on Alloy A composite is the alloy containing 0.4% manganese and 0.3% chromium of our invention. The B component of the Alloy C on Alloy B brazing sheet is the 0.15% chromium, balance aluminum plus about 0.04% iron and 0.04% silicon. The severe pitting of this material shows that it is not sufficient to incorporate chromium in a base with restricted iron and silicon contents. The deliberate manganese addition incorporated into Alloy A of the present invention is essential for adequate corrosion resistance.

EXAMPLE VI

Brazing sheets of Alloy D (MD 150) clad on Alloy 3003 and Alloy E (MD 177) clad on Alloy 3003 plus brazing sheets of Alloy D on Alloy A of the present invention and Alloy E on Alloy A of the present invention were all subjected to simulated vacuum brazing treatment. The treatment consisted of holding the material for a total of 12 minutes in a vacuum furnace set at 1100° F. at a pressure of $2 \times 10^{-4}$ Torr. The specimens were then removed from the furnace and air cooled. Samples were evaluated for susceptibility to intergranular corrosion by immersing same for 24 hours in a boiling solution prepared by dissolving the materials set forth in Table IV below in 10 liters of distilled water.

TABLE IV

| 1.48 grams | $Na_2SO_4$ |
| 1.65 grams | NaCl |
| 1.40 grams | $NaHCO_3$ |
| 0.29 grams | $FeCl_3$ |
| 0.39 grams | $CuSO_4 \cdot 7H_2O$ |

Figure 3A:
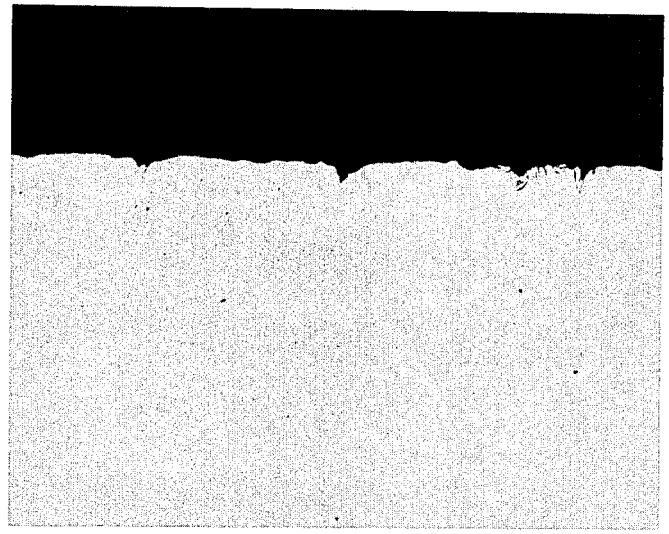
FIGS. 3A, 3B, 3C and 3D are photomicrographs at a magnification of 200X showing cross sections of composites after exposure to a corrosive environment.
Figure 3B:
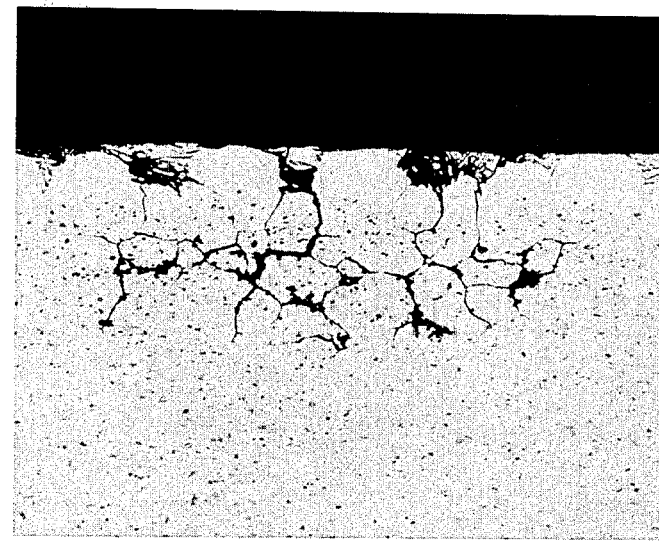
Figure 3C:
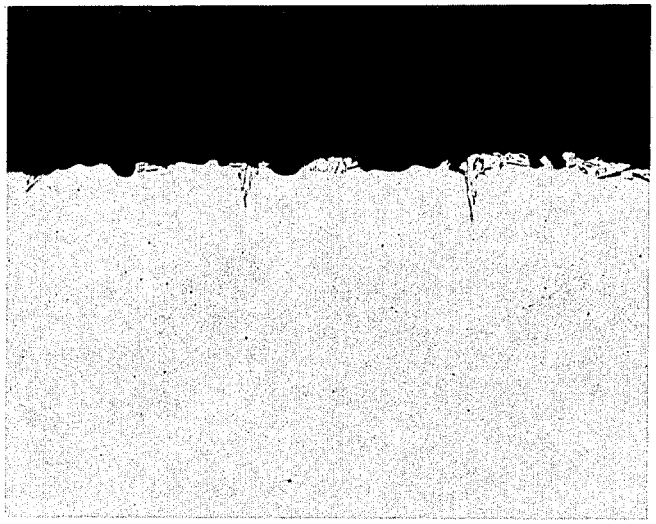
Figure 3D:
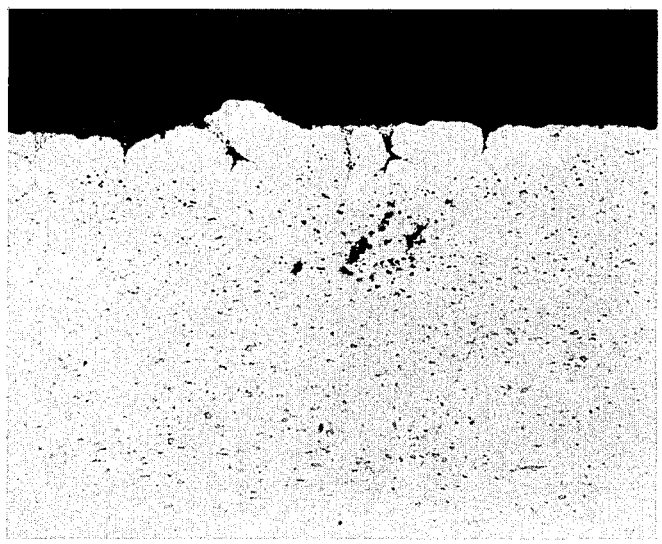

The specimens were allowed to remain in the solution for a further 24 hour period during which time the solution cooled to ambient temperature. The specimens were then removed from the solution and examined for intergranular corrosion. The specimen surfaces were marked in some places by white corrosion product which corresponded to internal intergranular corrosion. Metallographic cross sectioning of the specimens was carried out in the most extensive areas covered by the white corrosion product. Photomicrographs at 200X magnification of the polished cross sections are shown in FIG. 3. FIG. 3A represents Alloy D clad on Alloy A, FIG. 3B represents Alloy D clad on Alloy 3003, FIG. 3C represents Alloy E clad on Alloy A and FIG. 3D represents Alloy E clad on Alloy 3003. The results clearly show that the composite of the present invention is unaffected by the corrosive test medium using two types of vacuum brazing alloy. In contrast, composites using Alloy 3003 suffered varying degrees of intergranular corrosion depending upon whether the vacuum brazing alloy is Alloy D (silicon plus magnesium) or Alloy E (silicon plus magnesium plus bismuth).

EXAMPLE VII

Three core ingots were cast for each of the compositions set forth below with Alloy X representing the material of the present invention, Alloy Y being a comparative alloy and Alloy Z being of the composition of aluminum Alloy 3003.

| Silicon | up to | 0.1 |
| --- | --- | --- |
| Iron | up to | 0.2 |
| Manganese | - | 0.40 |
| Chromium | - | 0.25 |
| Titanium | - | 0.010 |
| Balance Aluminum | | |

One each of the direct chill castings of ingots of Alloys X, Y and Z were homogenized at 1000° F. for 8 hours using a maximum heat up rate from 600° F. of 50° F. per hour. The ingots were then air cooled to room temperature. The core materials of Alloys X, Y and Z were scalped to 1.5" thickness and were brushed on one side.

A second chill casting of ingots of each of the Alloys X, Y and Z were homogenized at 1060° F. for 8 hours again using a maximum heat up rate from 600° F. of 50° F. per hour. The ingots were cooled from 1060° F. to 1025° F. at 25° F. per hour and then were cooled to room temperature. The core materials of Alloys X, Y and Z were scalped to 1.5" thickness and were brushed on one side.

The final ingot of each Alloy X, Y and Z was homogenized at 1125° F. for 8 hours using a maximum heat up rate from 600° F. of 50° F. per hour. The ingots were cooled from 1125° F. to 1025° F. at 25° F. per hour and were cooled to room temperature. The core materials of Alloys X, Y and Z were scalped to 1.5" thickness and were brushed on one side.

The nine ingots thus treated were processed in the following manner for mechanical property evaluation, in particular, resistance to sag. The ingots were hot rolled at 800° F. and processed to final gage without an interannealing. A final anneal was given for each alloy at final gage at 660° F. for 2½ hours. Resistance to sag was determined by measuring the deflection which occurred at the free end of an 8" long×1" wide cantilevered sample (6" long projecting length) after a simulated brazing cycle. Sag resistance of each of the given alloy compositions was performed on samples having a gage of 0.030". The simulated vacuum brazing cycle consisted of heating the samples as rapidly as possible to 1100° F., about 10 minutes for 0.030" samples, followed by holding for 8 minutes at 1100° F., then air cooled to room temperature. This simulated vacuum brazing cycle closely duplicates the commercial practice of heating from room temperature to 1070° F. in less than 1 minute, holding more than 1 minute at temperatures in excess of 1070° F., cooling from 1070° F. to 800° F. in vacuum and then fan cooling to room temperature. The furnace temperature is 1100° F. to 1110° F. and the total elapsed time is about 18 minutes from the start of the cycle to transfer for cooling fan.

Figure 4:
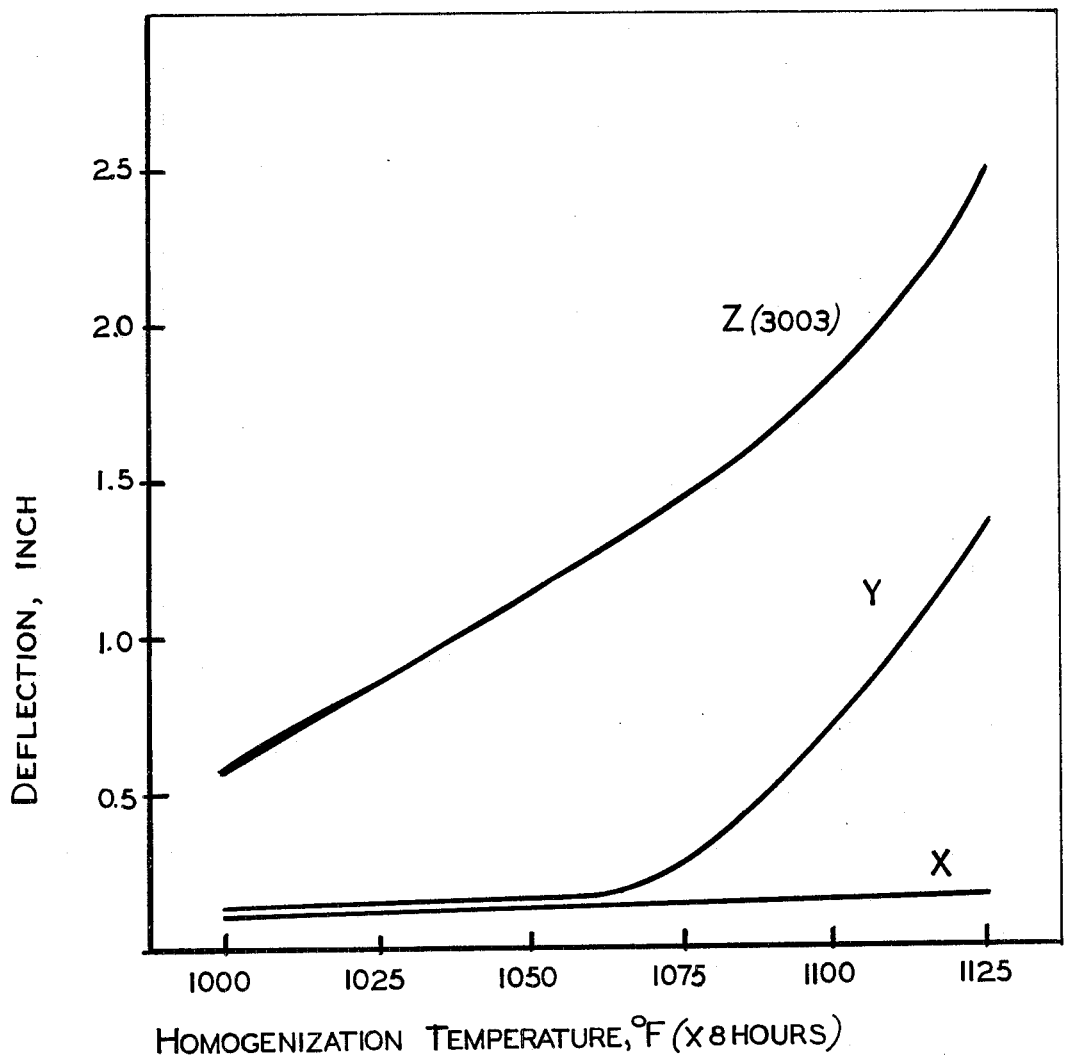
FIG. 4 is a graph depicting the improved sag resistant characteristics of the alloy of the present invention as compared to aluminum Alloy 3003.

FIG. 4 graphically illustrates the comparative sag resistance of the alloy of the present invention with that of comparative Alloy Y and Alloy Z, Alloy Z being aluminum Alloy 3003, as a function of the homogenization temperature. The typical homogenization temperature at which aluminum alloys are treated in the production of brazing sheet is in the order of 1100° F. to 1150° F. As can be seen from FIG. 4, the alloy of the present invention exhibits superior sag resistant properties to that of either Alloy Y or Alloy Z (aluminum Alloy 3003). The alloy of the present invention exhibits from about 1/5 to 1/25 of the sag deflection of aluminum Alloy 3003 when exposed to a simulated brazing cycle, the difference in sag resistance being dependent upon prior homogenization treatment of the initial sheet ingot. Thus, it can be seen that the alloy of the present invention exhibits superior sag resistance to those alloys normally used in the manufacture of brazed assemblies.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An improved corrosion resistant aluminum alloy exhibiting improved sag resistant properties when used in the manufacture of brazed assemblies, said alloy consisting essentially of not less than 0.15% and not more than 0.40% chromium, not less than 0.2% and not more than 0.9% manganese, up to 0.2% iron, up to 0.1% silicon, balance essentially aluminum.

2. A brazed article exhibiting improved sag resistant properties and having superior corrosion resistant properties in aqueous environments comprising an aluminum alloy consisting essentially of not less than 0.15% and not more than 0.40% chromium, not less than 0.2% and not more than 0.9% manganese, up to 0.2% iron, up to 0.1% silicon, balance essentially aluminum.

3. An aluminum alloy according to claim 1 wherein said alloy contains reduced size and population density of second phase iron containing particles.

4. An aluminum alloy according to claim 1 wherein said alloy is substantially free from highly cathodic $FeAl_3$ phase.

5. An aluminum alloy according to claim 1 wherein said alloy contains up to 0.1% iron.

* * * * *